(12) United States Patent
Tu et al.

(10) Patent No.: US 8,374,046 B2
(45) Date of Patent: Feb. 12, 2013

(54) COMPUTING DEVICE AND METHOD FOR CLEARING DATA STORED IN COMPLEMENTARY METAL-OXIDE SEMICONDUCTOR CHIP

(75) Inventors: Wen-Chong Tu, Shenzhen (CN); Jian Peng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 175 days.

(21) Appl. No.: 13/090,266

(22) Filed: Apr. 20, 2011

(65) Prior Publication Data
US 2012/0047307 A1 Feb. 23, 2012

(30) Foreign Application Priority Data
Aug. 19, 2010 (CN) .......................... 2010 1 0257318

(51) Int. Cl.
*G11C 7/00* (2006.01)

(52) U.S. Cl. ............... 365/218; 365/189.05; 365/189.16
(58) Field of Classification Search .................. 365/218, 365/189.05, 189.16–189.18, 189.14
See application file for complete search history.

(56) References Cited

U.S. PATENT DOCUMENTS
7,907,463 B2 * 3/2011 Edahiro et al. ................ 365/218

* cited by examiner

*Primary Examiner* — David Lam
(74) *Attorney, Agent, or Firm* — Altis Law Group, Inc.

(57) ABSTRACT

A method for clearing data stored in a complementary metal-oxide semiconductor (CMOS) chip of a computing device. The computing device further includes a CMOS jumper connected to the CMOS chip, and a general purpose input/output (GPIO) interface connected to the CMOS jumper. The method configures a GPIO pin of the GPIO interface as an output port, controls the GPIO pin to generate a GPIO signal with a high level, and outputs the GPIO signal with the high level to the CMOS jumper. After receiving a command of clearing data stored in the CMOS chip, the method pulls down the GPIO signal from the high level to a low level, to clear the data stored in the CMOS chip.

12 Claims, 3 Drawing Sheets

COMPUTING DEVICE AND METHOD FOR CLEARING DATA STORED IN COMPLEMENTARY METAL-OXIDE SEMICONDUCTOR CHIP

BACKGROUND

1. Technical Field

Embodiments of the present disclosure relate to data reconfiguration systems and methods, and more particularly, to a computing device and a method for clearing data stored in a complementary metal-oxide semiconductor (CMOS) chip.

2. Description of Related Art

A complementary metal-oxide semiconductor is a chip that stores a computer's basic input/output system (BIOS) settings, basic instructions, and information about the date, time and hardware settings in the computer. The CMOS is powered by a battery. At present, if the above-mentioned data stored in the CMOS needs to be cleared under certain conditions, for example, a user may forget the BIOS password, there are two common used methods to reset the CMOS. One method is to short-circuit a CMOS jumper or another method is to remove the battery from a motherboard of the computer manually; however both methods may cause damage to components of the computer.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
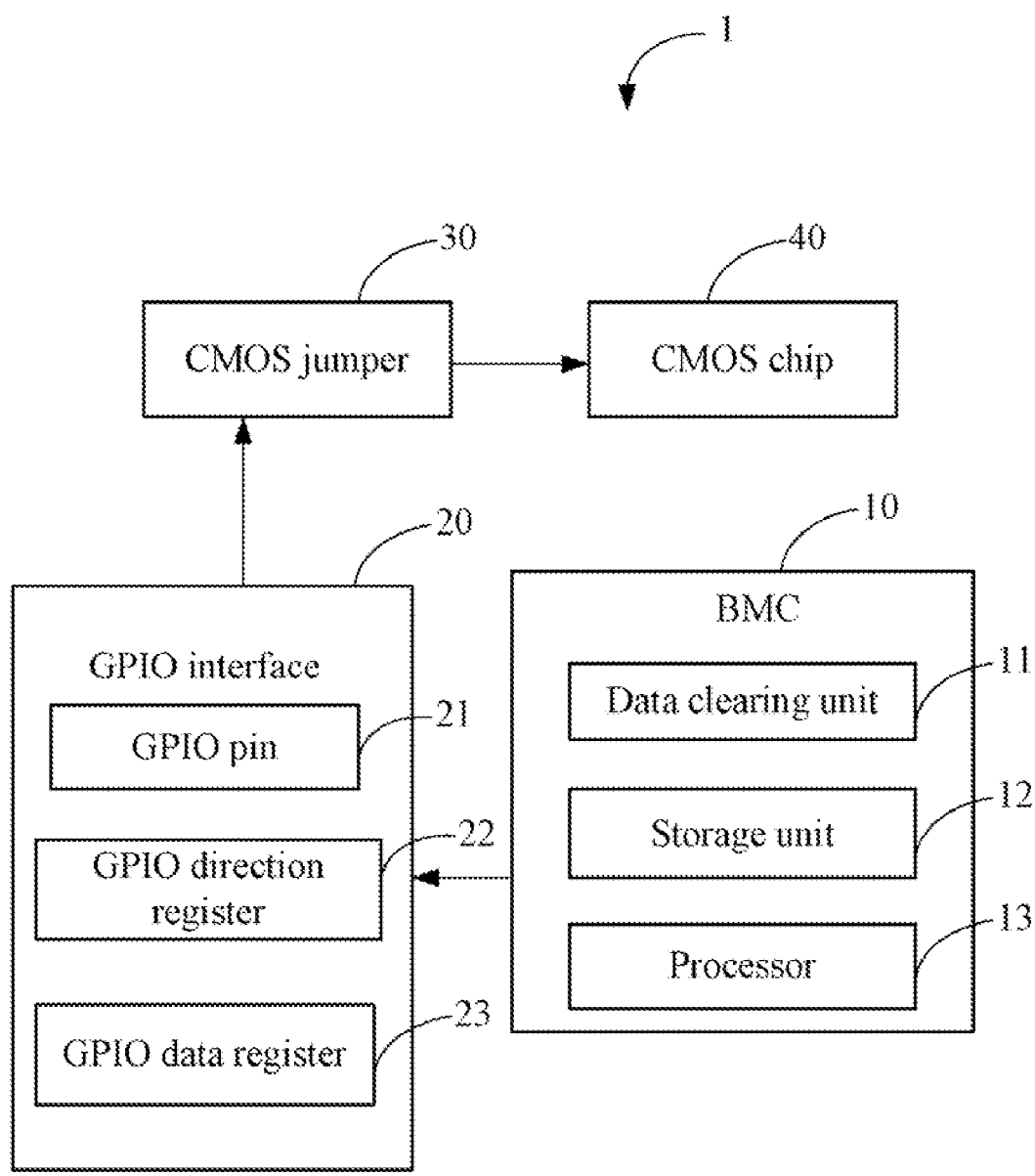
FIG. 1 is a block diagram of one embodiment of a computing device.

FIG. 1 is a block diagram of one embodiment of a computing device 1. The computing device 1 includes a base motherboard controller (BMC) 10, a general purpose input/output (GPIO) interface 20 connected to the BMC 10, a complementary metal-oxide semiconductor (CMOS) jumper 30 connected to the GPIO interface 20, and a CMOS chip 40 connected to the CMOS jumper 30. The CMOS chip 40 stores basic input/output system (BIOS) data of the computing device 1. The GPIO interface 20 includes a plurality of GPIO pins 21 (only one shown), a GPIO direction register 22, and a GPIO data register 23. Each GPIO pin 21 can be configured to be an input or output port. The GPIO direction register 22 includes a plurality of bits for recording function (such as input or output) of each GPIO pin 21, and the GPIO data register 23 includes a plurality of bits for recording level status (e.g., high or low) of a GPIO signal output or input by each GPIO pin 21. The computing device 1 may be a computer or a server, for example.

The BMC 10 includes a data clearing unit 11 operable to configure a GPIO pin 21 of the GPIO interface 20 as an output port, control the output port to generate a GPIO signal with a high level (i.e., high voltage or logic 1) and output the GPIO signal with the high level to the CMOS jumper 30, to maintain data stored in the CMOS 40. The data clearing unit 11 is further operable to pull down the GPIO signal with the high level to a low level (i.e., low voltage or logic 0), to short-circuit the CMOS jumper 30 for clearing the data stored in the CMOS chip 40. In one embodiment, the data clearing unit 11 may include one or more function modules (detailed description is given in FIG. 2). The one or more function modules may comprise computerized code in the form of one or more programs that are stored in a storage unit 12, and executed by a processor 13 of the BMC 10 to provide the above-mentioned functions of the data clearing unit 11. Depending on the embodiment, the storage unit 12 may be a smart media card, a secure digital card, or a compact flash card.

Figure 2:
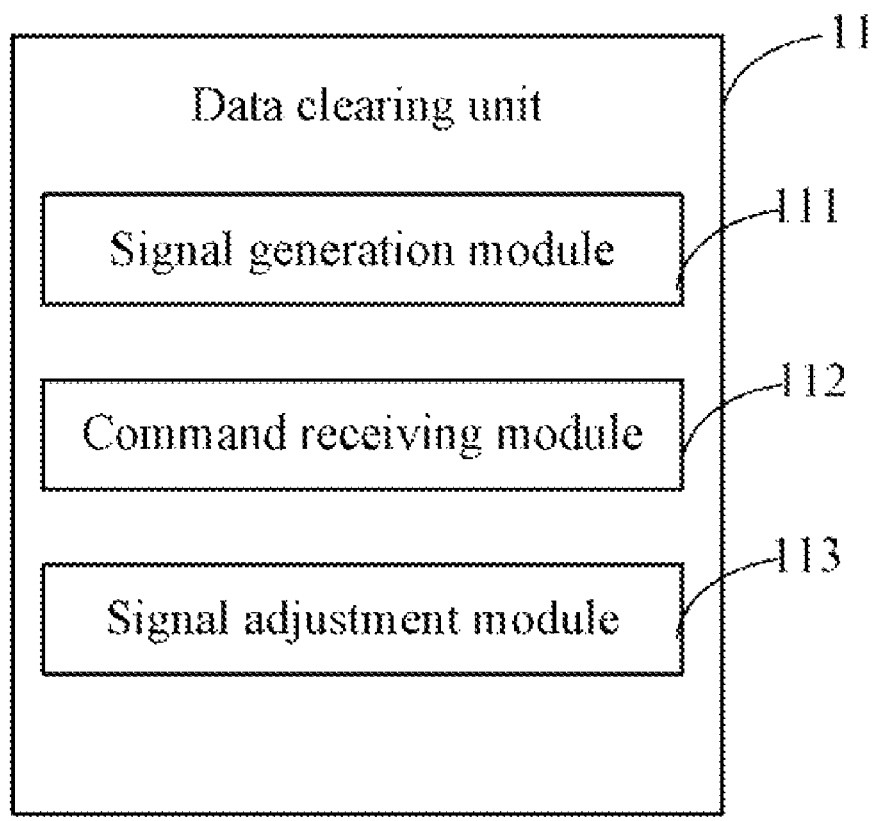
FIG. 2 is a block diagram of one embodiment of function modules of a data clearing unit in the computing device of FIG. 1.

As shown in FIG. 2, the data clearing unit 11 includes a signal generation module 111, a command receiving module 112, and a signal adjusting module 113. The signal generation module 111 is operable to configure a GPIO pin 21 as an output port by writing a first logic value to a bit associated with the GPIO pin 21 in the GPIO direction register 22. In one embodiment, the first logic value may be 1. For example, the GPIO direction register 22 may have 32 bits, each bit may be associated with a certain GPIO pin 21, when the bit is given the first logic value 1, the certain GPIO pin 21 may be configured as an output port.

The signal generation module 111 is further operable to control the GPIO pin 21 to generate a GPIO signal with a high level by writing a second logic value to a bit associated with the GPIO pin 21 in the GPIO data register 23. In addition, the signal generation module 111 outputs the GPIO signal with the high level to the CMOS jumper 30, to maintain the data stored in the CMOS chip 40. In one embodiment, the second logic value may also be 1. For example, the GPIO data register 23 may have 32 bits, each bit may be associated with a certain GPIO pin 21. If the bit is given a logic value 1, a GPIO signal output by or input to the certain GPIO pin 21 may has the high level, or if the bit is given a logic value 0, the GPIO signal output by or input to the certain GPIO pin 21 may has a low level.

The command receiving module 112 is operable to receive a command of clearing the data stored in the CMOS chip 40 from a user.

The signal adjusting module 113 is operable to pull down the GPIO signal from the high level to the low level by replacing the second logic value stored in the bit associated with the GPIO pin 21 in the GPIO data register 23 with a third logic value, to clear the data stored in the CMOS chip 40. For example, the signal adjusting module 113 replaces the logic value 1 stored in the bit associated with the GPIO pin 21 in the GPIO data register 23 with the logic value 0. So that the GPIO signal output to the CMOS jumper 30 is pulled down from the high level to the low level, which induces a short circuit of the CMOS jumper 30 and causes data loss of the CMOS chip 40. The signal adjusting module 113 is further operable to maintain the GPIO signal at the low level for a preset interval (such as 3 seconds), to make sure that the data stored in the CMOS chip 40 has been cleared completely.

The signal adjusting module 113 is operable to pull up the GPIO signal from the low level to the high level by replacing the third logic value stored in the bit associated with the GPIO pin 21 in the GPIO data register 23 with the second logic value after the preset interval, so that new data may be written to the CMOS chip 40 by the user. For example, after 3 seconds, the signal adjusting module 113 replaces the logic value 0 stored in the bit associated with the GPIO pin 21 in the GPIO data register 23 with the logic value 1, so that the GPIO signal output to the CMOS jumper 30 is pulled up from the low level to the high level.

Figure 3:
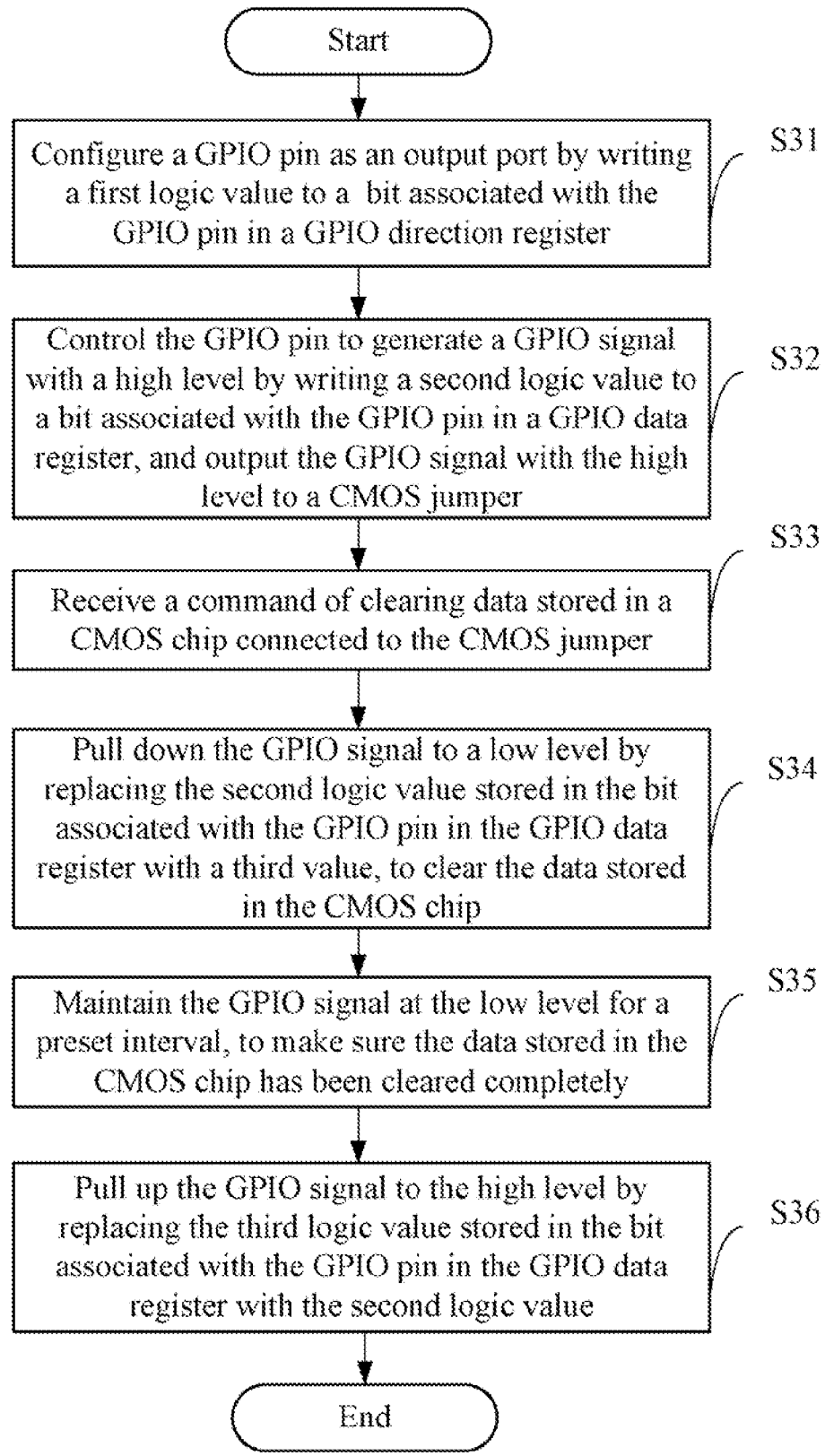
FIG. 3 is a flowchart of one embodiment of a method for clearing data stored in a complementary metal-oxide semiconductor (CMOS) chip.

FIG. 3 is a flowchart of one embodiment of a method clearing data stored in the CMOS chip 40. Depending on the embodiment, additional blocks may be added, others removed, and the ordering of the blocks may be changed.

In block S31, the signal generation module 111 writes a first logic value to a bit associated with the GPIO pin 21 in the GPIO direction register 22, to configure the GPIO pin 21 as an output port. For example, the first logic value is 1.

In block S32, the signal generation module 111 writes a second logic value to a bit associated with the GPIO pin 21 in the GPIO data register 23, to enable the GPIO pin 21 to generate a GPIO signal with a high level. Furthermore, the signal generation module 111 outputs the GPIO signal with the high level to the CMOS jumper 30, to maintain the data stored in the CMOS chip 40. For example, the second logic value is 1.

In block S33, the command receiving module 112 receives a command of clearing the data stored in the CMOS chip 40 from a user.

In block S34, the signal adjusting module 113 replaces the second logic value stored in the bit associated with the GPIO pin 21 in the GPIO data register 23 with a third logic value, to pull down the GPIO signal from the high level to a low level, to clear the data stored in the CMOS chip 40. For example, the third logic value is 0. The signal adjusting module 113 replaces the logic value 1 stored in the bit associated with the GPIO pin 21 in the GPIO data register 23 with the logic value 0. So that the GPIO signal output to the CMOS jumper 30 is pulled down from the high level to the low level, which induces a short circuit of the CMOS jumper 30 and causes data lost of the CMOS chip 40.

In block S35, the signal adjusting module 113 maintains the GPIO signal at the low level for a preset interval (such as 3 seconds), to make sure the data stored in the CMOS chip 40 has been cleared completely.

In block S36, the signal adjusting module 113 replaces the third logic value stored in the bit associated with the GPIO pin 21 in the GPIO data register 23 with the second value after the preset interval, to pull up the GPIO signal to the high level, so that new data may be written to the CMOS chip 40 by the user.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-based method for clearing data stored in a complementary metal-oxide semiconductor (CMOS) chip, the CMOS chip being connected to a CMOS jumper, the CMOS jumper being connected to a general purpose input/output (GPIO) interface, the method comprising:

writing a first logic value to a bit of a GPIO direction register of the GPIO interface, the bit associated with a GPIO pin of the GPIO interface, to configure the GPIO pin as an output port;

writing a second logic value to a bit of a GPIO data register of the GPIO interface, the bit associated with the GPIO pin, to enable the GPIO pin to generate a GPIO signal with a high level, and outputting the GPIO signal with the high level to the CMOS jumper;

receiving a command to clear the data stored in the CMOS chip; and replacing the second logic value stored in the bit associated with the GPIO pin in the GPIO data register with a third logic value, to pull down the GPIO signal from the high level to a low level, so as to clear the data stored in the CMOS chip.

2. The method as claimed in claim 1, further comprising:

maintaining the GPIO signal at the low level for a preset interval, to make sure that the data stored in the CMOS chip has been cleared completely.

3. The method as claimed in claim 2, further comprising:

replacing the third logic value stored in the bit associated with the GPIO pin in the GPIO data register with the second value after the preset interval, to pull up the GPIO signal from the low level to the high level, so as to enable new data be written to the CMOS chip.

4. The method as claimed in claim 1, wherein the first logic value and the second logic value is 1, and the third logic value is 0.

5. A computing device, comprising:

a complementary metal-oxide semiconductor (CMOS) chip;

a CMOS jumper connected to the CMOS chip;

a general purpose input/output (GPIO) interface connected to the CMOS jumper;

a storage device;

at least one processor; and a data clearing unit comprising computerized code in the form of one or more programs, which are stored in the storage device and executable by the at least one processor, the one or more programs comprising:

a signal generation module operable to configure a GPIO pin of the GPIO interface as an output port by writing a first logic value to a bit of a GPIO direction register of the GPIO interface, control the GPIO pin to generate a GPIO signal with a high level by writing a second logic value to a bit of a GPIO data register of the GPIO interface, and output the GPIO signal with the high level to the CMOS jumper, wherein the bit of the GPIO direction register and the bit of the GPIO data register are associated with the GPIO pin;

a command receiving module operable to receive a command to clear the data stored in the CMOS chip; and a signal adjusting module operable to pull down the GPIO signal from the high level to a low level by replacing the second logic value stored in the bit associated with the GPIO pin in the GPIO data register with a third logic value, to clear the data stored in the CMOS chip.

6. The computing device as claimed in claim 5, wherein the signal adjusting module is further operable to maintain the GPIO signal at the low level for a preset interval, to make sure that the data stored in the CMOS chip has been cleared completely.

7. The computing device as claimed in claim 6, wherein the signal adjusting module is further operable to replace the third logic value stored in the bit associated with the GPIO pin in the GPIO data register with the second value after the preset interval, to pull up the GPIO signal from the low level to the high level, so as to enable new data be written to the CMOS chip.

8. The computing device as claimed in claim 5, wherein the first logic value and the second logic value is 1, and the third logic value is 0.

9. A non-transitory computer readable medium storing a set of instructions, the set of instructions capable of being executed by a processor of a computing device to perform a method for clearing data stored in a complementary metal-oxide semiconductor (CMOS) chip, the CMOS chip being connected to a CMOS jumper, the CMOS jumper being connected to a general purpose input/output (GPIO) interface, the method comprising:

writing a first logic value to a bit of a GPIO direction register of the GPIO interface, the bit associated with a GPIO pin of the GPIO interface, to configure the GPIO pin as an output port;

writing a second logic value to a bit of a GPIO data register of the GPIO interface, the bit associated with the GPIO pin, to enable the GPIO pin to generate a GPIO signal with a high level, and outputting the GPIO signal with the high level to the CMOS jumper;

receiving a command to clear the data stored in the CMOS chip; and replacing the second logic value stored in the bit associated with the GPIO pin in the GPIO data register with a third logic value, to pull down the GPIO signal from the high level to a low level, so as to clear the data stored in the CMOS chip.

10. The non-transitory computer readable medium as claimed in claim 9, wherein the method further comprises:

maintaining the GPIO signal at the low level for a preset interval, to make sure that the data stored in the CMOS chip has been cleared completely.

11. The non-transitory computer readable medium as claimed in claim 10, wherein the method further comprises:

replacing the third logic value stored in the bit associated with the GPIO pin in the GPIO data register with the second value after the preset interval, to pull up the GPIO signal from the low level to the high level, so as to enable new data be written to the CMOS chip.

12. The non-transitory computer readable medium as claimed in claim 9, wherein the first logic value and the second logic value is 1, and the third logic value is 0.

* * * * *